US012647491B2

(12) United States Patent
Keller et al.

(10) Patent No.: US 12,647,491 B2
(45) Date of Patent: Jun. 2, 2026

(54) HANDLING DISCOVERY REQUESTS IN A NETWORK

(71) Applicant: Telefonaktiebolaget LM Ericsson (publ), Stockholm (SE)

(72) Inventors: Ralf Keller, Würselen (DE); Mary Amarisa Robison, Aachen (DE); David Castellanos Zamora, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 8 days.

(21) Appl. No.: 18/721,545

(22) PCT Filed: Dec. 19, 2022

(86) PCT No.: PCT/EP2022/086820
§ 371 (c)(1),
(2) Date: Jun. 18, 2024

(87) PCT Pub. No.: WO2023/118024
PCT Pub. Date: Jun. 29, 2023

(65) Prior Publication Data
US 2025/0088566 A1    Mar. 13, 2025

(30) Foreign Application Priority Data
Dec. 20, 2021    (EP) ..................................... 21383160

(51) Int. Cl.
*H04L 67/51*    (2022.01)
(52) U.S. Cl.
CPC .................................... *H04L 67/51* (2022.05)

(58) Field of Classification Search
None
See application file for complete search history.

(56) References Cited

U.S. PATENT DOCUMENTS

2021/0083965 A1* 3/2021 Taft ....................... H04L 1/0016
2024/0236677 A1* 7/2024 Rajput ................ H04L 63/0281

FOREIGN PATENT DOCUMENTS

WO         2020200268 A1    10/2020
WO    WO-2022206462 A1 * 10/2022    .......... H04W 12/037
WO    WO-2023001881 A1 *  1/2023    ............ H04W 8/005

OTHER PUBLICATIONS

3rd Generation Partnership Project, "Technical Specification Group Core Network and Terminals; 5G System; Equipment Identity Register Services; Stage 3 (Release 17)"; 3GPP Technical Specification 29.511 v17.2.0, Sep. 2021, pp. 1-19.

(Continued)

*Primary Examiner* — Lance Leonard Barry
(74) *Attorney, Agent, or Firm* — COATS & BENNETT, PLLC

(57)    ABSTRACT

A security relay node receives (710) a discovery request from a service consumer. The discovery request requests discovery of a network function to provide a service. The security relay node directs (720) the discovery request to a selected one of a plurality of remote security relay nodes of a target network and forwards (730), to the service consumer, a discovery response identifying the network function to provide the service.

19 Claims, 8 Drawing Sheets

(56) References Cited

OTHER PUBLICATIONS

3rd Generation Partnership Project, Technical Specification Group Core Network and Terminals; 5G System; Network Function Repository Services; Stage 3(Release 17); 3GPP Technical Specification 29.510 v17.3.0; Sep. 2021, pp. 1-271.

3rd Generation Partnership Project, Technical Specification Group Services and Systems Aspects; System architecture for the 5G System (5GS); Stage 2 (Release 17); 3GPP Technical Specification 23.501 v17.2.0; Sep. 2021, pp. 1-542.

3rd Generation Partnership Project, "Technical Specification Group Services and Systems Aspect; Procedures for the 5G System (5GS); Stage 2 (Release 17)"; 3GPP Technical Specification 23.502 v17.2.1; Sep. 2021, pp. 1-712.

* cited by examiner

700

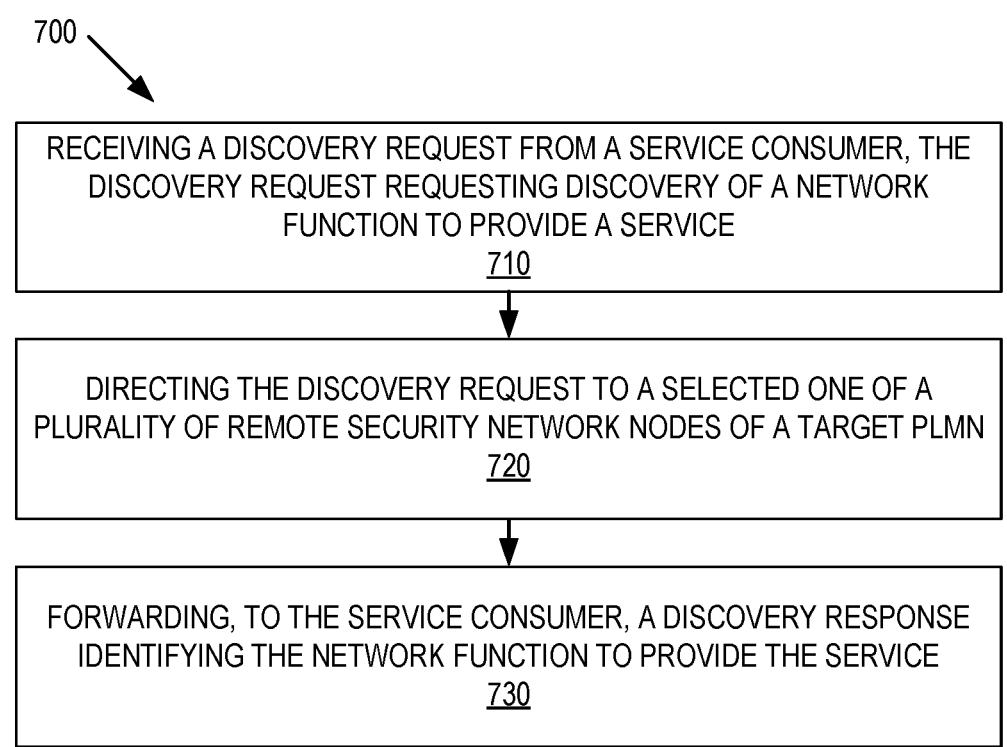

RECEIVING A DISCOVERY REQUEST FROM A SERVICE CONSUMER, THE DISCOVERY REQUEST REQUESTING DISCOVERY OF A NETWORK FUNCTION TO PROVIDE A SERVICE
710

DIRECTING THE DISCOVERY REQUEST TO A SELECTED ONE OF A PLURALITY OF REMOTE SECURITY NETWORK NODES OF A TARGET PLMN
720

FORWARDING, TO THE SERVICE CONSUMER, A DISCOVERY RESPONSE IDENTIFYING THE NETWORK FUNCTION TO PROVIDE THE SERVICE
730

Figure 7

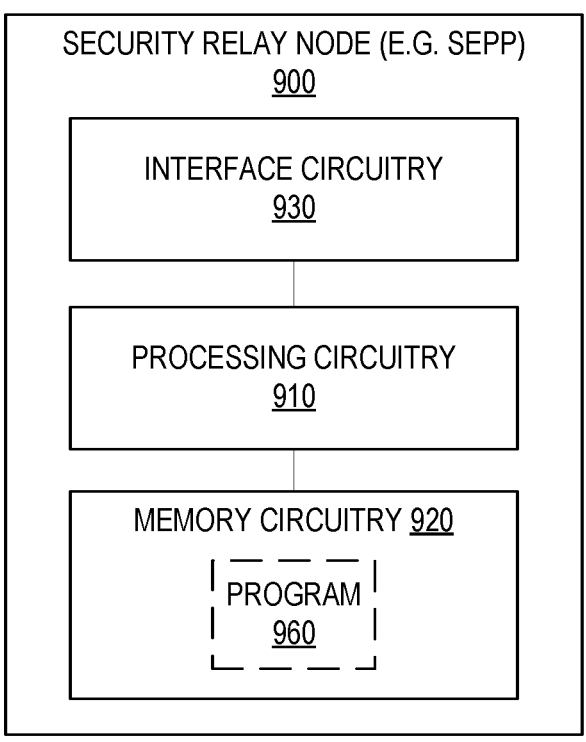

SECURITY RELAY NODE (E.G. SEPP)
900

INTERFACE CIRCUITRY
930

PROCESSING CIRCUITRY
910

MEMORY CIRCUITRY 920

PROGRAM
960

Figure 8

HANDLING DISCOVERY REQUESTS IN A NETWORK

TECHNICAL FIELD

The present disclosure generally relates to the field of wireless communication networks and, more particularly, to handling discovery requests in a network.

BACKGROUND

Communication networks often interoperate with each other to provide continuity of service to User Equipment (UE) roaming between such networks. Different networks can be a potential source of disruption, e.g., in the form of malicious software, data scraping, spoofing, denial of service attacks, credential theft, and/or other security risks. To combat such security threats, security functions are commonly placed at the edges of networks. To ensure that a UE roaming away from a home network can continue to access services and data networks through its home network, the visited network traditionally must have some knowledge of the security function of the home network.

SUMMARY

The present disclosure generally relates to handling discovery requests in a network. Embodiments of the present disclosure generally relate to network edge security function discovery and, more specifically, to the discovery of network edge security functions in wireless communication networks. Particular embodiments advantageously enable the mobility of user equipment between networks and, in particular, enable enhanced mobility for UEs roaming in or away from Third Generation Partnership Project (3GPP) networks.

Particular embodiments include a method implemented by a security relay node in a communication network. The method comprises receiving a discovery request from a service consumer. The discovery request requests discovery of a network function to provide a service. The method further comprises directing the discovery request to a selected one of a plurality of remote security relay nodes of a target network and forwarding, to the service consumer, a discovery response identifying the network function to provide the service.

In some embodiments, the method may further comprise passing signaling relating to the service between the service consumer and the network function providing the service through the selected remote security relay node.

In some embodiments, the security relay node may be preconfigured with addresses of the plurality of remote security relay nodes previous to receiving the discovery request. In other embodiments, the method may further comprise discovering the plurality of remote security relay nodes in response to receiving the discovery request requesting discovery of the network function. In some such embodiments, discovering the plurality of remote security relay nodes may comprise sending a further discovery request to a primary one of the remote security relay nodes. The further discovery request may be requesting identification of each other remote security relay node in the plurality of remote security relay nodes. In some further of such embodiments, sending the further discovery request to the primary remote security relay node may comprise sending the further discovery request to the primary remote security relay node during establishment of a first N32 connection with the primary remote security relay node.

In some other embodiments in which discovery is performed, the method may further comprise establishing a first N32 connection with a primary one of the remote security relay nodes. Discovering the plurality of remote security relay nodes may comprise sending a further discovery request to a Network Repository Function (NRF) via the primary remote security relay node over the first N32 interface. The further discovery request may request identification of the plurality of remote security relay nodes.

In some yet other embodiments in which discovery is performed, discovering the plurality of remote security relay nodes may comprise sending a further discovery request to a repository function. The further discovery request may request identification of the plurality of remote security relay nodes. In some such embodiments, each of the plurality of remote security relay nodes may be registered with the repository function in advance of the sending of the further discovery request. In other such embodiments, the repository function may be preconfigured with the addresses of the plurality of remote security relay nodes in advance of the sending of the further discovery request.

In some embodiments, the method may further comprise, responsive to selecting the one of a plurality of remote security relay nodes, establishing a second N32 connection with the selected one of the plurality of remote security relay nodes and directing the discovery request via the second N32 connection.

In some embodiments, each of the remote security relay nodes may be associated with a respective segment of the target network. Each segment corresponds to a respective set of one or more subscriber identifiers.

Other embodiments include a security relay node. The security relay node comprises processing circuitry and a memory. The memory contains instructions executable by the processing circuitry whereby the security relay node is configured to receive a discovery request from a service consumer. The discovery request requests discovery of a network function to provide a service. The security relay node is further configured to direct the discovery request to a selected one of a plurality of remote security relay nodes of a target network and forward, to the service consumer, a discovery response identifying the network function to provide the service.

In some embodiments, the security relay node may be further configured to perform any of the methods described above.

Yet other embodiments include a computer program comprising instructions which, when executed on processing circuitry of a security relay node, cause the processing circuitry to carry out the method according to any one of the methods described above.

Yet other embodiments include a carrier containing such a computer program. The carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a communication network 10, generally, as opposed to discussion of particular instances of communication networks 10a, 10b).

FIG. 7 is a flow diagram illustrating an example method implemented by a security relay node, according to one or more embodiments of the present disclosure.

FIG. 8 is a schematic block diagram illustrating an example security relay node, according to one or more embodiments of the present disclosure.

DETAILED DESCRIPTION

In general, the discussion below is provided in the context of a Fifth Generation (5G) wireless communication network. Notwithstanding, those skilled in the art will appreciate that the techniques and solutions provided below are not limited in their applicability to 5G networks. Indeed, many of the teachings provided below may also be used in wireless communication networks operating according to other standards. In particular, the embodiments described below may be particularly well suited for (but not limited to) derivatives of, and/or successors to, 5G networks, for example. Other embodiments may additionally or alternatively be used in predecessor Third Generation Partnership Project (3GPP) networks.

Figure 1:
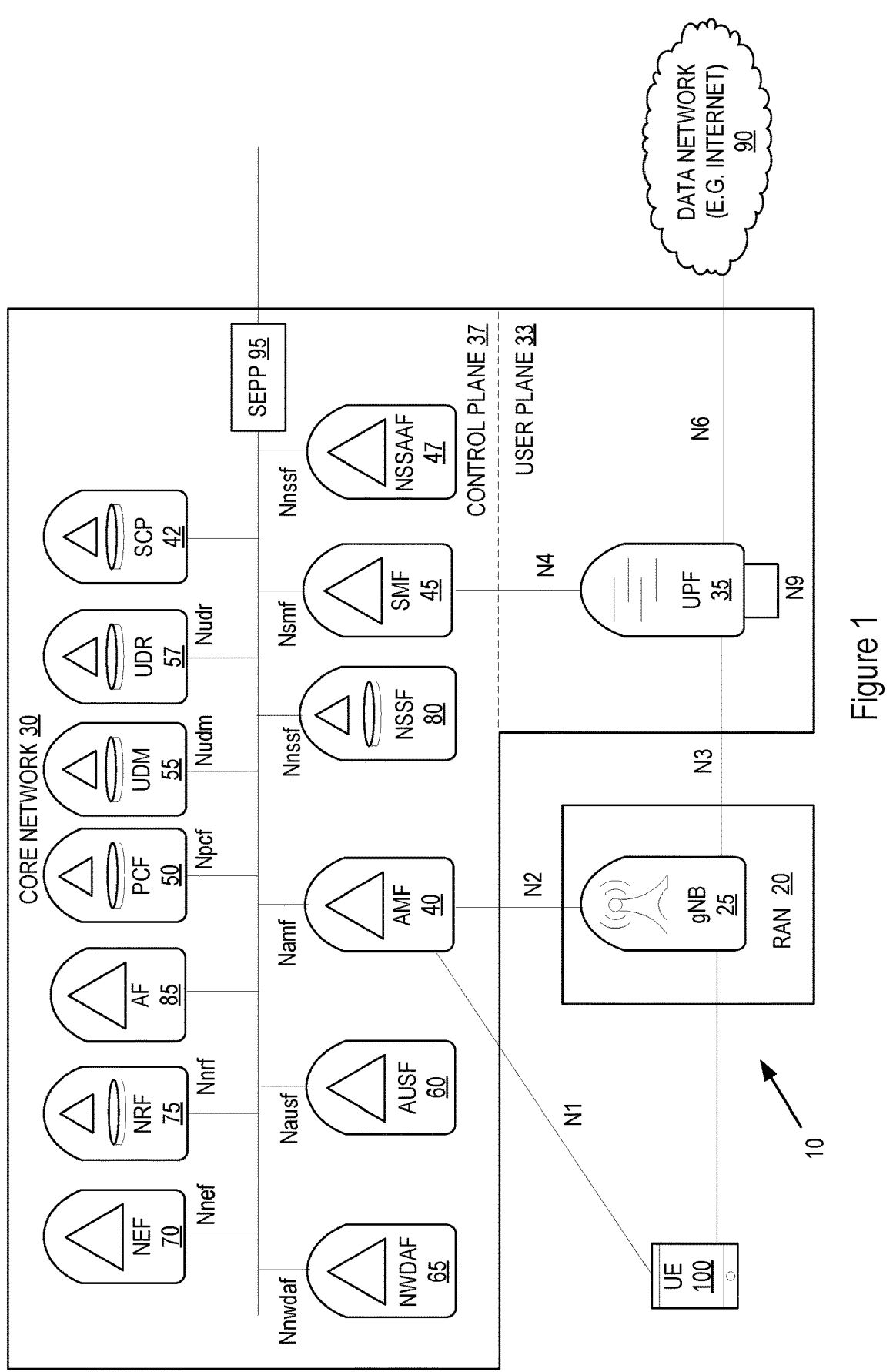
FIG. 1 is a schematic block diagram illustrating an example of a communication network that provides a User Equipment (UE) with access to a data network, according to one or more embodiments of the present disclosure.

FIG. 1 illustrates an example communication network 10 that is consistent with the 3GPP 5G system architecture. The communication network 10 comprises a radio access network (RAN) 20 and a core network 30 employing a service-based architecture. The service-based architecture for the 5G Core (5GC) was defined in 3GPP Release 15, has evolved in Release 16, and may continue to evolve in future releases. The RAN 20 and the core network 30, when operated by the same operator, are sometimes collectively referred to as a Public Land Mobile Network (PLMN). In other embodiments, the RAN 20 and the core network 30 may be a Standalone Non-Public Network (SNPN) or Public Mobile Network (PMN). Although several examples below will be described in terms of PLMNs, it should be understood that other embodiments instead involve SNPNs and/or PLMs and that similar principles will apply.

The RAN 20 comprises one or more base stations 25 that are configured to provide radio access to one or more UEs 100 operating within a coverage area of the PLMN. In the context of certain 5G networks, a base station 25 may be referred to as a gNodeBs (gNB). The core network 30 provides a connection between the RAN 20 and one or more data networks (DNS) 90, such as the Internet, for example. In the example illustrated in FIG. 1, the communication network 10 includes a Visited PLMN (VPLMN) that provides a local breakout to the DN 90. That said, in other examples to be discussed in greater detail below, the PLMN of particular embodiments may instead provide a home-routed user plane to a Home PLMN (HPLMN) where a breakout to the DN 90 occurs.

The core network 30 comprises a plurality of network functions (NFs). These NFs may be in either the user plane 33 or the control plane 37 of the core network 30. The user plane 33 (sometimes referred to as the data plane) typically carries user data traffic. The control plane 37 typically carries signaling traffic (e.g., control packets).

In the example illustrated in FIG. 1, the NFs of the user plane 33 comprise a User Plane Function (UPF) 35. The NFs of the control plane 37 comprise an Access and Mobility Management Function (AMF) 40, a Session Communication Proxy (SCP) 42, a Session Management Function (SMF) 45, a Network Slice Specific Authentication and Authorization Function (NSSAAF) 47, a Policy Control Function (PCF) 50, a Unified Data Management (UDM) function 55, a Unified Data Repository (UDR) function 57, an Authentication Server function (AUSF) 60, a Network Data Analytics Function (NWDAF) 65, a Network Exposure Function (NEF) 70, a Network Repository Function (NRF) 75, and a Network Slice Selection Function (NSSF) 80. The control plane 37 of the core network 30 also includes an Application Function (AF) 85, and a Security Edge Protection Proxy (SEPP) 95.

The SEPP 95 is a proxy for control plane messages configured to protect the edge of an operator network. Among other things, the SEPP 95 may be configured to protect control plane signaling between network operators, hide the network topology from other networks, and/or filter control plane messages exchanged in support of roaming scenarios.

The NFs of the core network 30 comprise logical entities that reside in one or more core network nodes, which may be implemented using computing hardware, such as one or more processors, memory, network interfaces, or a combination thereof. The functions may reside in a single core network node or may be distributed among a plurality of core network nodes. The NFs may communicate with one another using predefined interfaces. Some of the interfaces are referred to by standardized reference points within the network, whereas other interfaces are simply named.

N1 is a reference point between a UE 100 and the AMF 40. N2 is a reference point between the RAN 20 and the AMF 40. N3 is a reference point between the RAN 20 and the UPF 35. N4 is a reference point between the SMF 45 and the UPF 35. N6 is a reference point between the UPF 35 and the DN 90. N9 is a reference point between UPFs 35. Several of the NFs expose a service-based interface named after them in the format Nxxx, wherein xxx is the name of the NF. For example, the NEF 70 provides an Nnef interface, the NRF 75 provides an Nnrf interface, and so on.

Figure 2:
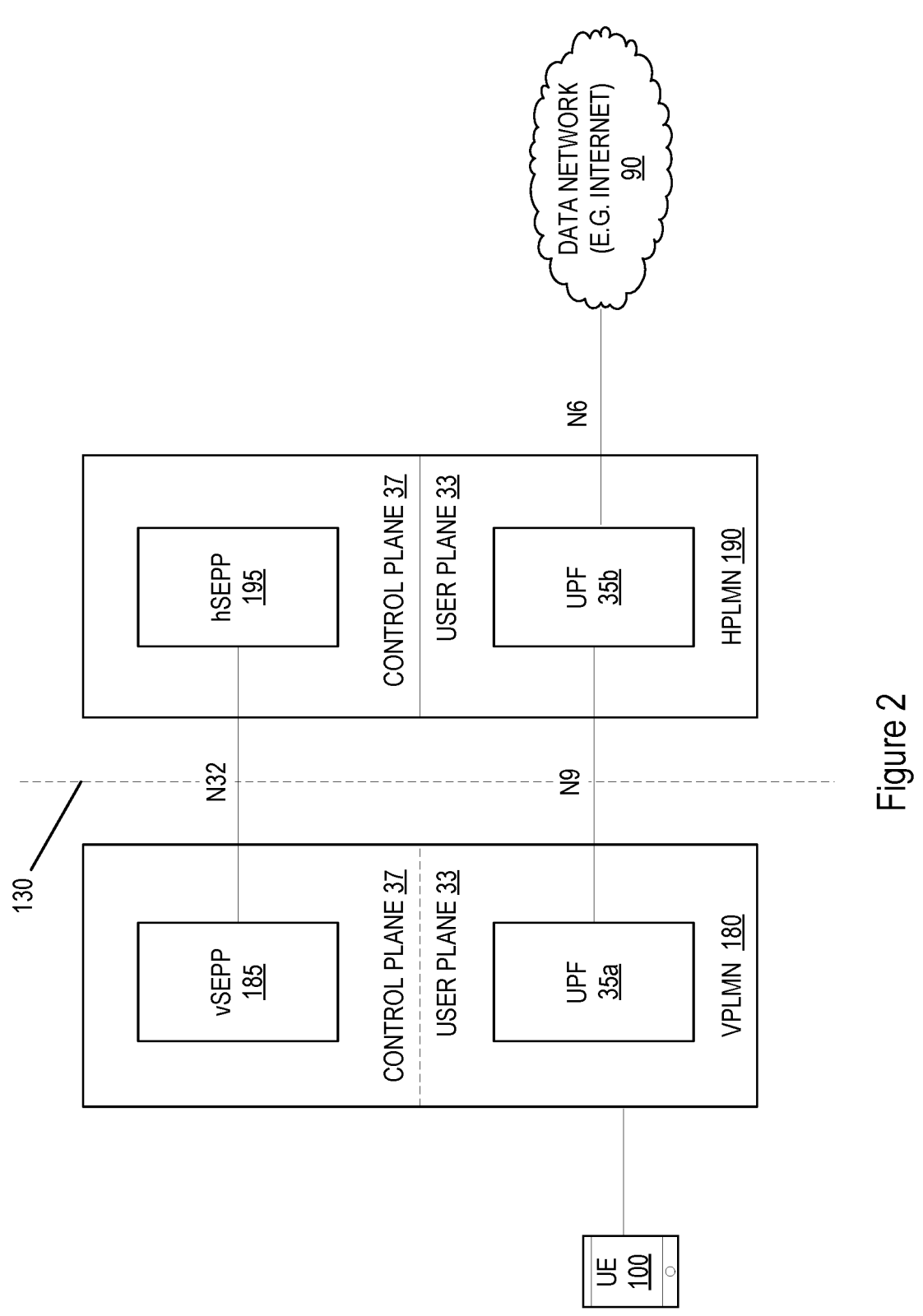
FIG. 2 is a schematic block diagram illustrating an example network environment supporting inter-Public Land Mobile Network (PLMN) communication, according to one or more embodiments of the present disclosure.

FIG. 2 illustrates an example of a UE 100 that has roamed away from its Home PLMN (HPLMN) 190 and is currently attached to a VPLMN 180. In contrast to FIG. 1, FIG. 2 illustrates a home-routed scenario in which break out to the DN 90 occurs at the HPLMN 190. For clarity of explanation, FIG. 2 does not depict the functions of the control plane 37 other than the Visited SEPP (vSEPP) 185 of the VPLMN 180 and the Home SEPP (hSEPP) 195 of the HPLMN 190. The VPLMN 180 and the HPLMN 190 use the vSEPP 185 and hSEPP 195, respectively, to provide security functions at the edge 130 between the PLMNs 180, 190. The vSEPP 185 and the hSEPP 195 can communicate with each other over an interface, namely the N32 interface. The N32 interface may include an N32-c interface for negotiating security capabilities between SEPPs and an N32-f interface for data plane signaling (e.g., encrypted messages between PLMNs 10).

In the example illustrated in FIG. 2, the VPLMN 180 can comprise a UPF 35a. The UPF 35a of the VPLMN 180 can be in the user plane 33. Similarly, the HPLMN 190 can comprise a UPF 35b. The UPF 35b of the HPLMN 190 can be in the user plane 33. The UPFs 35a, 35b can communicate with each other over an interface, namely an N9 interface. The UPF 35b of the HPLMN 190 and the DN 90 can communicate with each other over an interface, namely an N6 interface.

Although the example of FIG. 2 describes SEPPs 95 in terms of whether they are in a vPLMN 180 (i.e., vSEPP 185) or an hPLMN 190 (i.e., hSEPP 195) of a subscriber, a SEPP 95 may alternatively be referred to based on its role with respect to a requested service. In particular, a SEPP 95 may be referred to based on whether the SEPP 95 is on the service consumer side or the service provider side. Generally, an NF that consumes (e.g. uses) a service can be referred to as an NF service consumer (NFc) and an NF that produces (e.g. exposes/offers/provides) a service can be referred to as an NF service producer (NFp). In this regard, a SEPP 95 on the service consumer side may be referred to as a consumer SEPP (cSEPP), whereas a SEPP 95 on the service provider side may be referred to as a producer SEPP (pSEPP). In general, when the SEPPs of different networks first interact, the vSEPP 185 is likely to be cSEPP, whereas the hSEPP 195 is likely to be a pSEPP. That said, once the SEPPs of the two networks are known to each other, either SEPP may be a cSEPP or a pSEPP for subsequent interactions between the two.

The SEPP 95 of a given network may be required to provide security functions for a great many roaming relations that the operator has with other networks, which may be hundreds, for example. However, 3GPP does not specify any mechanism by which a SEPP 95 may discover another SEPP 95.

Due to the lack of any such discovery mechanism, attempts to locate the hSEPP 195 may operate on the assumption that a Fully Qualified Domain Name (FQDN) and/or Internet Protocol (IP) Address of the hSEPP 195 will be configured in the vSEPP 185 based on a Service Level Agreement (SLA) between the PLMNs 180, 190. Traditionally, SLA configuration per peer PLMN 10 can be required to manage Transport Layer Security (TLS) certificate information.

An alternative to pre-configuring the vSEPP 185 as described above may be to use the FQDN and a Domain Name System (DNS) for hSEPP 195 discovery. That is, the vSEPP 185 may construct an FQDN based on a Mobile Network Code (MNC) and a Mobile Country Code (MCC) and then use DNS to find the corresponding IP address. Such a solution may be applied before establishing the N32 interface between the vSEPP 185 and hSEPP 195.

However, this use of an FQDN and DNS does not adequately address a variety of network deployments. One example of a network deployment that is inadequately served by the aforementioned solutions is one in which the HPLMN 190 is subdivided into regions each of which has a respective hSEPP 195, i.e., so that the most suitable SEPP(s) 95 for outbound and inbound roamers into a particular region may be used.

Another network deployment that is inadequately served by such solutions is one in which different SEPPs 95 should be used for different Subscription Permanent Identifier (SUPI) and/or Subscription Concealed Identifier (SUCI) ranges of the PLMN 10. For example, the above-described discovery solutions would not address a deployment in which a given SUPI and/or SUCI range should be directed to a first hSEPP, whereas a different SUPI and/or SUCI range should be directed to a second hSEPP.

Yet another network deployment that is inadequately served by the aforementioned discovery solutions is one in which the HPLMN 190 has leased an International Mobile Subscriber Identity (IMSI) range to another operator or Mobile Virtual Network Operator (MVNO) using the same PLMN identifier (ID).

Of course, deployments that use a combination of any of these approaches would similarly be inadequately served (e.g., subdivided SUPI ranges, subdivided HPLMN regions, and/or leased IMSI range).

In view of the above, embodiments of the present disclosure may use either an FQDN that can be resolved via DNS or an IP address as an address for a given hSEPP 95b. The vSEPP 95a can use the address of the hSEPP 95b and establish an N32-c connection as needed. The vSEPP 95a may use this approach for as many hSEPPs as needed.

Figure 3:
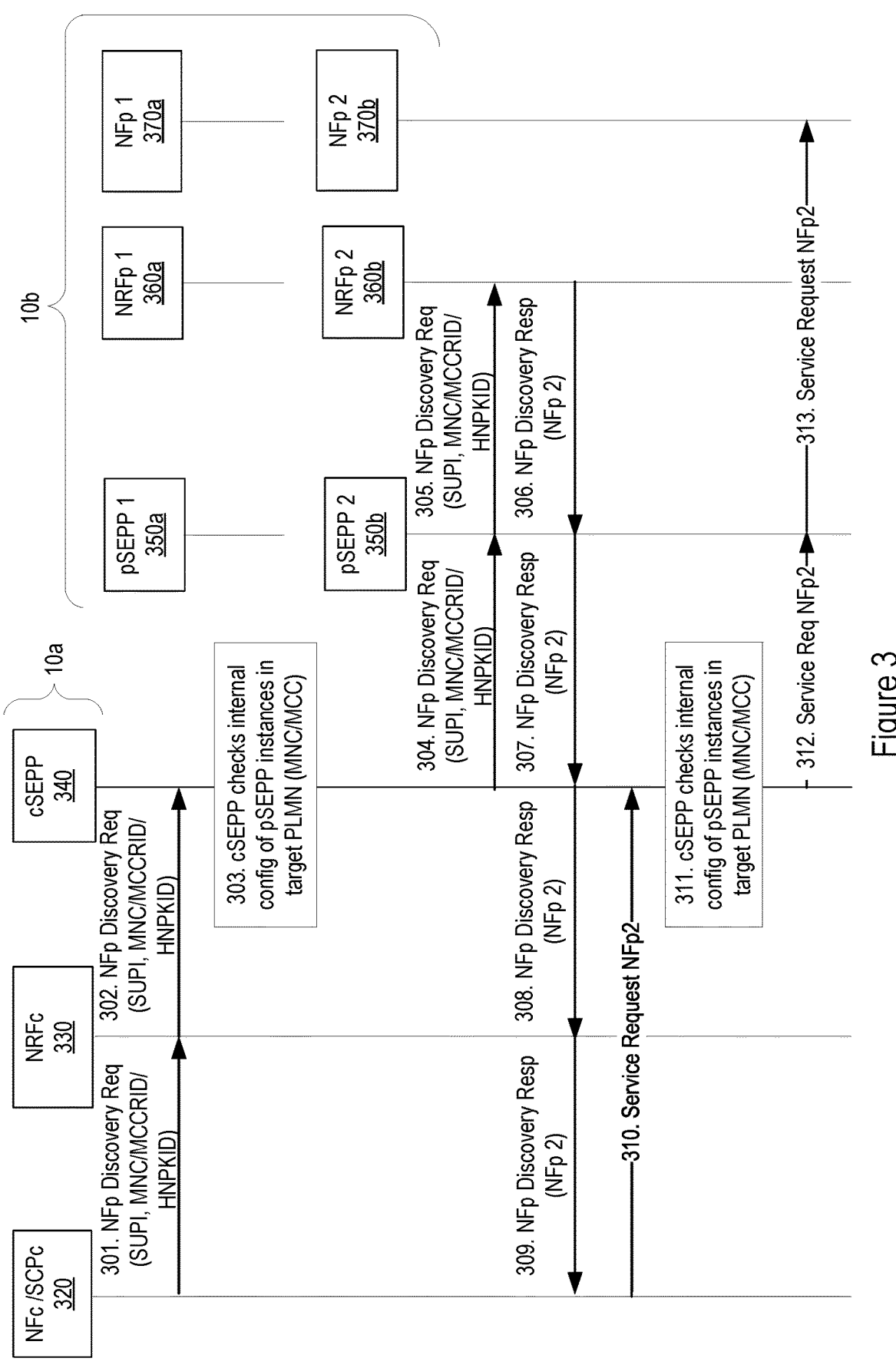
FIG. 3 is a call flow diagram illustrating a first example network function discovery procedure, according to particular embodiments of the present disclosure.

FIG. 3 illustrates an example embodiment of the present disclosure in which the configuration of a cSEPP 340 in a first PLMN 10a is extended to include the addresses (e.g., FQDN/IP addresses) of the different SEPPs (or SEPP instances) 350a, 350b deployed in a target PLMN 10b. The extension of this configuration may, in some embodiments, be performed in the cSEPP 340 for each of a plurality of PLMNs 10. The different SEPPs 350a, 350b deployed in the target PLMN 10b can be referred to as "pSEPP 1" and "pSEPP 2" respectively. There can also be different NRFps 360a, 360b deployed in the target PLMN 10b, which can be referred to as "NRFp 1" and "NRFp 2" respectively. There can also be different NFps 370a, 370b deployed in the target PLMN 10b, which can be referred to as "NFp 1" and "NFp 2" respectively.

According to the embodiment of FIG. 3, a service consumer 320 (e.g., an NF consumer (NFc) or SCP consumer (SCPc)) may send a discovery request to an NRF consumer (NRFc) 330 (step 301). Thus, the NRFc 330 can receive the discovery request from the service consumer 320. The discovery request is a request for discovery of an appropriate NF provider 370a, 370b. The discovery request can comprise a SUPI, an MNC, an MCC, a registered application provider identifier (RID), and/or a home network public key identifier (HNPKID).

The NRFc 330 may forward the discovery request to a cSEPP 340 (step 302). Thus, the cSEPP 340 can receive the discovery request from the NRFc 330. The cSEPP 340 may check its internal configuration of pSEPP 350a, 350b instances that are indicated to be in the target PLMN having the MNC/MCC provided in the discovery request (step 303). The cSEPP 340 may forward the discovery request to an appropriate pSEPP 350b (step 304). Thus, the pSEPP 350b can receive the discovery request from the cSEPP 340. In turn, the pSEPP 350b may forward the discovery request to a corresponding NRF provider (NRFp) 360b (step 305). Thus, the NRFp 360b can receive the discovery request from the pSEPP 350b. Although the examples provided herein illustrate NRFps 360a, 360b, it should be noted that the NRFps 360a, 360b of the PLMN 10b may be parts of a common logical NRF system.

The NRFp 360*b* may send a discovery response to the pSEPP 350*b* (step 306). Thus, the pSEPP 350*b* can receive the discovery response from the NRFp 360*b*. The discovery response can comprise an address of NFp 370*b*. The pSEPP 350*b* forwards the discovery response to the cSEPP 340 (step 307). Thus, the cSEPP 340 can receive the discovery response from the pSEPP 350*b*. In turn, the cSEPP 340 may forward the discovery response to the NRFc 330 (step 308). Thus, the NRFc 330 can receive the discovery response from the cSEPP 340. In turn, the NRFc 330 may forward the discovery response to the service consumer 320 that sent the initial discovery request (step 309). Thus, the service consumer 320 that sent the initial discovery request can receive the discovery response from the NRFc 330.

The service consumer 320 may send a service request to the cSEPP 340 (step 310). Thus, the cSEPP 340 can receive the service request from the service consumer 320. The service request can be for a service provided by the discovered NFp 370*b*. The cSEPP 340 may check its internal configuration of pSEPP 350*a*, 350*b* instances that are indicated to be in the target PLMN having the MNC/MCC provided in the service request (step 311). The cSEPP 340 may forward the service request to the pSEPP 350*b* in the provider network of the NFp 370*b* (step 312). Thus, the pSEPP 350*b* can receive the service request from the cSEPP 340. The pSEPP 350*b* may then forward the service request on to the NFp 370*b* (step 313). Thus, the NFp 370*b* can receive the service request from the pSEPP 350*b*.

In this way, discovery requests comprising respective SUPIs falling within different ranges associated with one or more parameters may be directed to different pSEPPs 350*a*, 350*b*. For example, a discovery request comprising a SUPI within a first range associated with one or more parameters (e.g., MNC/MCC, RID/HNPKID) may be directed to a first pSEPP 350*a*, whereas a discovery request comprising a SUPI within a second range associated with the one or more parameters may be directed to a second pSEPP 350*b*. Although a Global System for Mobile Communications Association (GSMA) Roaming Exchange (RAEX) could instead be used to provide the information described above to the cSEPP 340, doing so would make such information available to all roaming partners.

Figure 4A:
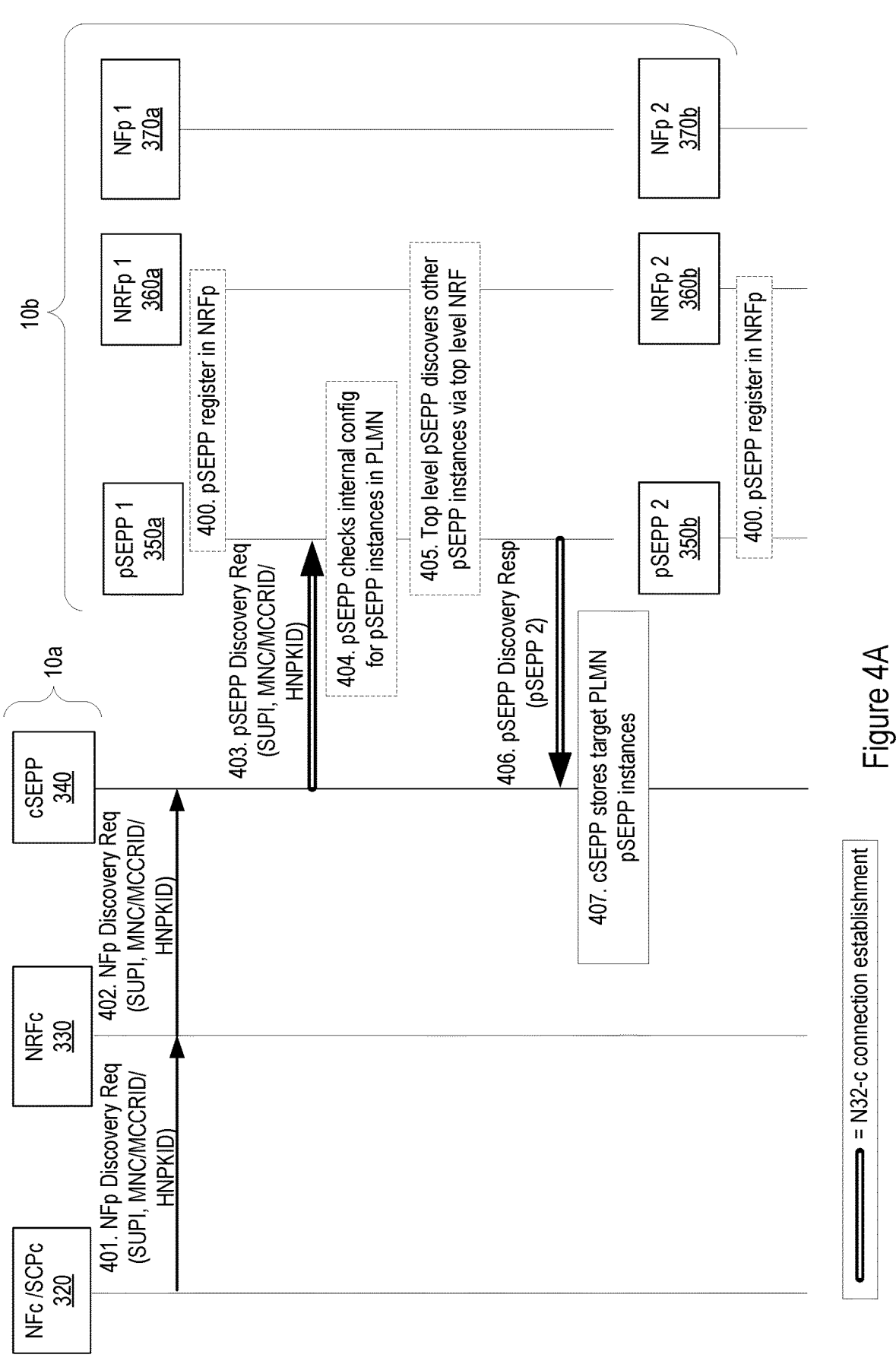
FIGS. 4A-4B are call flow diagrams illustrating a second example network function discovery procedure, according to particular embodiments of the present disclosure.
Figure 4B:
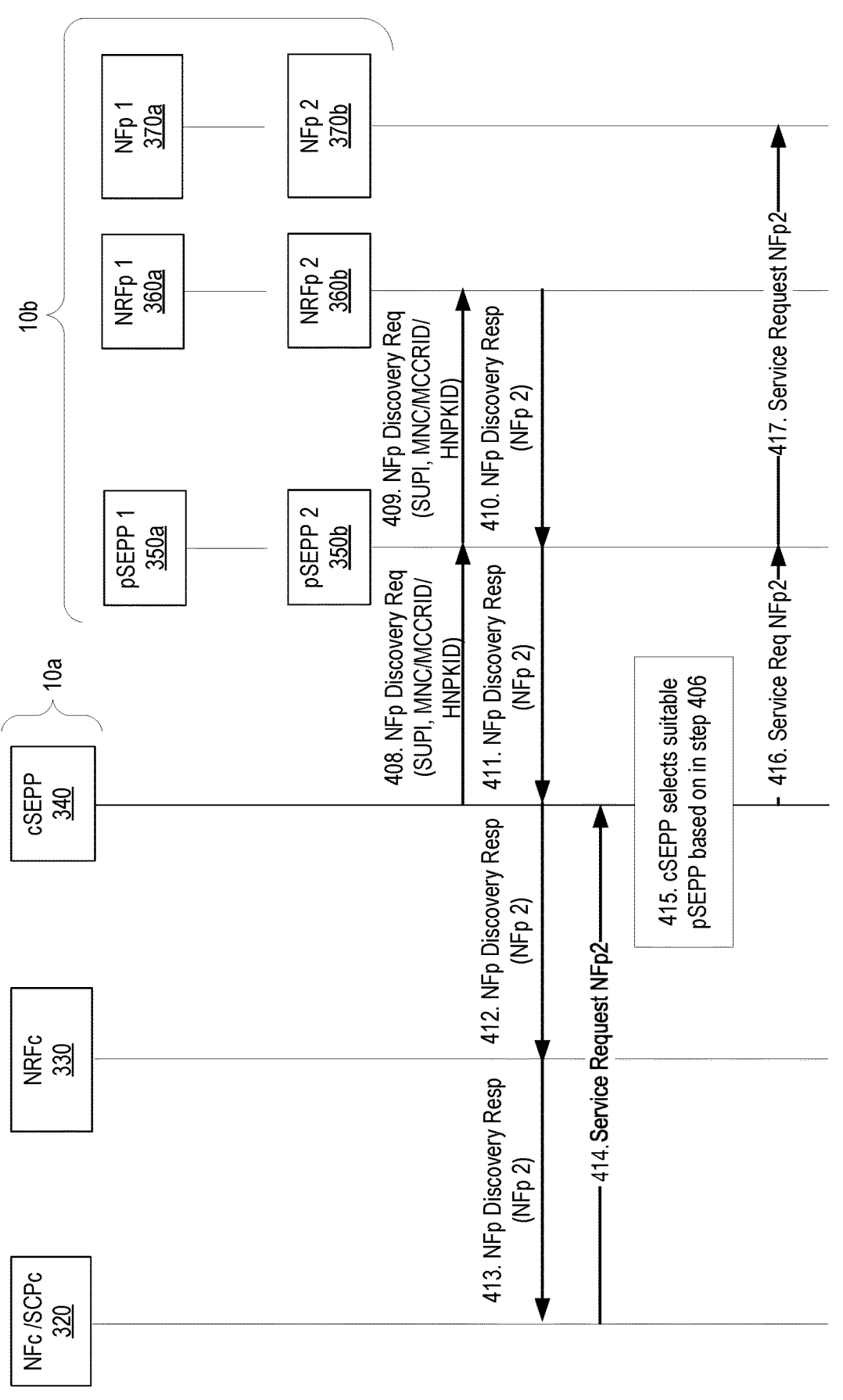

Another example embodiment of the present disclosure is illustrated in FIG. 4 (spanning FIGS. 4A-B). In the example illustrated in FIG. 4, the top level pSEPP of PLMN 10*b* is pSEPP 350*a*. According to the example of FIG. 4, SEPP discovery is extended over a roaming interface, which allows the cSEPP 340 to support discovery from a top level pSEPP 350*a* in the target PLMN 10*b*. The service consumer 320 (e.g., an NFc or SCPc) may send a discovery request to an NRFc 330 (step 401). Thus, the NRFc 330 can receive the discovery request from the service consumer 320. The NRFc 330 may forward the discovery request to the cSEPP 340 (step 402). Thus, the cSEPP 340 can receive the discovery request from the NRFc 330.

During N32-c connection establishment between the cSEPP 340 and the top level pSEPP 350*a*, the cSEPP 340 may send a discovery request to the pSEPP 350*a* for the SEPP instances deployed at the target PLMN 10*b* (step 403). Thus, the pSEPP 350*a* can receive the discovery request from the cSEPP 340.

The pSEPP instances deployed at the target PLMN 10*b* may be configured into the top level pSEPP 350*a* similarly to the cSEPP 340 in the example of FIG. 3, in which case the pSEPP 350*a* may check its internal configuration for the pSEPP instances (step 404). Alternatively, the top level pSEPP 350*a* may discover other pSEPP instances 350*b* available at the PLMN 10*b* using the NRF 360*a* in the PLMN 10*b* (step 405). In this case, the SEPP instances 350*a*, 350*b* within the PLMN 10*b* may be required to have previously registered in an NRF 360*a*, 360*b* (step 400). This registration can include additional SEPP segmentation information (e.g. Group call Identifier (GID), RID/HNPKID or SUPI range).

The list of pSEPPs 350*a*, 350*b* (with additional information like applicable SUPI range, GID, RID/HNPKID) may be conveyed via N32-c from the pSEPP 350*a* to the cSEPP 340 (step 406). For example, the pSEPP 350*a* may send a discovery response comprising this information to the cSEPP 340. Thus, the cSEPP 340 can receive the discovery response from the pSEPP 350*a*. Thereby, a segmentation of the SEPPs can be introduced with segmentation parameters like GID, RID/HNPKID or SUPI range. This allows the cSEPP 340 to store the pSEPP instances 350*a*, 350*b* (step 407) with the relevant information received in the previous step (e.g., in a table). The cSEPP 340 can subsequently establish an N32 connection to the best-suited pSEPP (pSEPP 350*b*, in the example illustrated in FIG. 4) for a particular inbound subscriber of the target PLMN 10*b*.

Having established an N32 connection with pSEPP 350*b*, the cSEPP 340 may forward the NFp discovery request to the selected pSEPP 350*b* (step 408). Thus, the pSEPP 350*b* can receive the discovery request from the cSEPP 340. The pSEPP 350*a* may forward the discovery request to a corresponding NRFp 360*b* (step 409). Thus, the NRFp 360*b* can receive the discovery request from the pSEPP 350*a*. The NRFp 360*b* may send a discovery response to the pSEPP 350*b* (step 410). Thus, the pSEPP 350*b* can receive the discovery response from the NRFp 360*b*. In turn, the pSEPP 350*b* may forward the discovery response to the cSEPP 340 (step 411). Thus, the cSEPP 340 can receive the discovery response from the pSEPP 350*b*. In turn, the cSEPP 340 may forward the discovery response to the NRFc 330 (step 412). Thus, the NRFc 330 can receive the discovery response from the cSEPP 340. Finally, the NRFc 330 may send the discovery response on to the service consumer 320 (step 413). Thus, the service consumer 320 can receive the discovery response from the NRFc.

The service consumer 320 may then send a service request to the cSEPP 340 (step 414). Thus, the cSEPP 340 can receive the service request from the service consumer 320. The service request can be for a service provided by the discovered NFp 370*b*. The cSEPP 340 may select pSEPP 350*b* based on the information stored in step 406 (step 415). The cSEPP 340 may forward the service request to the selected pSEPP 350*b* (step 416). Thus, the pSEPP 350*b* can receive the service request from the cSEPP 340. The pSEPP 350*b* may then forward the service request on to the NFp 370*b* (step 417). Thus, the NFp 370*b* can receive the service request from the pSEPP 350*b*.

Figure 5:
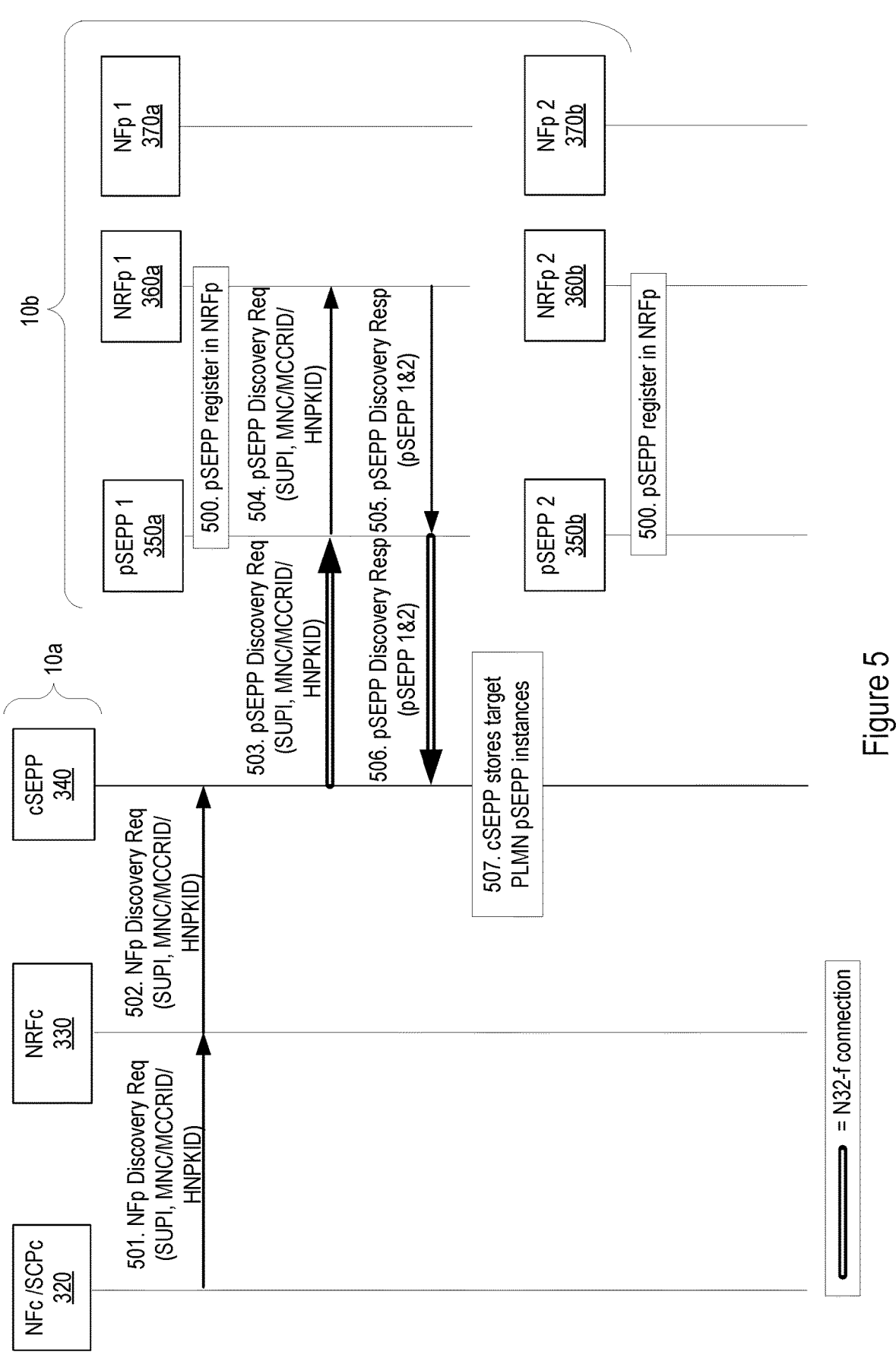
FIG. 5 is a call flow diagram illustrating a third example network function discovery procedure, according to particular embodiments of the present disclosure.

Yet another example embodiment of the present disclosure is illustrated in FIG. 5. As in the previous example, the top level pSEPP of PLMN 10*b* in the example illustrated in FIG. 5 is pSEPP 350*a*. In the example of FIG. 5, SEPP discovery can be performed over the roaming interface, thereby allowing the cSEPP 340 to discover other pSEPP instances 350*a*, 350*b* within the target PLMN 10*b* from a top level NRFp 360*a* in the target PLMN 10*b*.

The pSEPP instances 350*a*, 350*b* within the PLMN 10*b* may be required to register in the NRF 360*a*, 360*b* (step 500). This registration may include additional SEPP segmentation information (e.g. GID, RID/HNPKID, SUPI range, PLMN ID). It should be noted that the NRFs 360*a*, 360*b* within PLMN 10*b* can be part of a single, common, logical NRF system.

As in previous examples, the service consumer 320 may send a discovery request to an NRFc 330 (step 501). Thus, the NRFc 330*c* can receive the discovery request from the service consumer 320. The NRFc 330 may forward the discovery request to the cSEPP 340 (step 502). Thus, the cSEPP 340 can receive the discovery request from the NRFc 330. In the example illustrated in FIG. 5, the cSEPP 340 can establish an N32-f connection with the top level pSEPP 350*a* in the target PLMN 10*b*. The top level pSEPP 350*a* can be located using the MNC/MCC of the target PLMN 10*b* and DNS. Subsequently, the cSEPP 340 may send a discovery request for the SEPP instances 350*a*, 350*b* deployed at the target PLMN 10*b*, via the top level pSEPP 350*a* (step 503), to the top level NRFp 360*a* at the target PLMN 10*b* (step 504). Thus, the top level pSEPP 350*a* can receive the discovery request from the cSEPP 340, and the top level NRFp 360*a* can receive the discovery request from the top level pSEPP 350*a*. The NRFp 360*a* may be located using an FQDN based on the MNC/MCC of the target PLMN 10*b* and a DNS.

The NRFp 360*a* may send a discovery response to the pSEPP 350*a* (step 505). Thus, the pSEPP 350*a* can receive the discovery response from the NRFp 360*a*. The pSEPP 350*a* may forward the discovery response to the cSEPP 340 (step 506). Thus, the cSEPP 340 can receive the discovery response from the pSEPP 350*a*. The pSEPP discovery response can include the list of pSEPPs 350*a*, 350*b* in the PLMN 10*b* with additional information like applicable SUPI range, GID, RID/HNPKID, PLMN ID. This discovery response can be conveyed via N32-f to the cSEPP 340. Thereby a segmentation of SEPPs is introduced, with segmentation parameters like GID, RID/HNPKID, SUPI range or PLMN ID, allowing thereby the cSEPP 340 to store the pSEPP instances and the segmentation parameters for later use (e.g., in a table) (step 507). That is, the cSEPP can store the additional information like relevant identifiers and/or ranges thereof (e.g., SUPI ranges, GIDs, RIDs/HNPKIDs, PLMN IDs). The cSEPP may then establish an N32 connection to whichever pSEPP 350*a*, 350*b* is best suited for a particular inbound subscriber belonging to the target PLMN 10*b*. In this regard, having established an N32 connection to an appropriate pSEPP 350*b*, the embodiments may proceed according to steps 407 through 416 as previously described above with respect to FIG. 4B.

Figure 6:
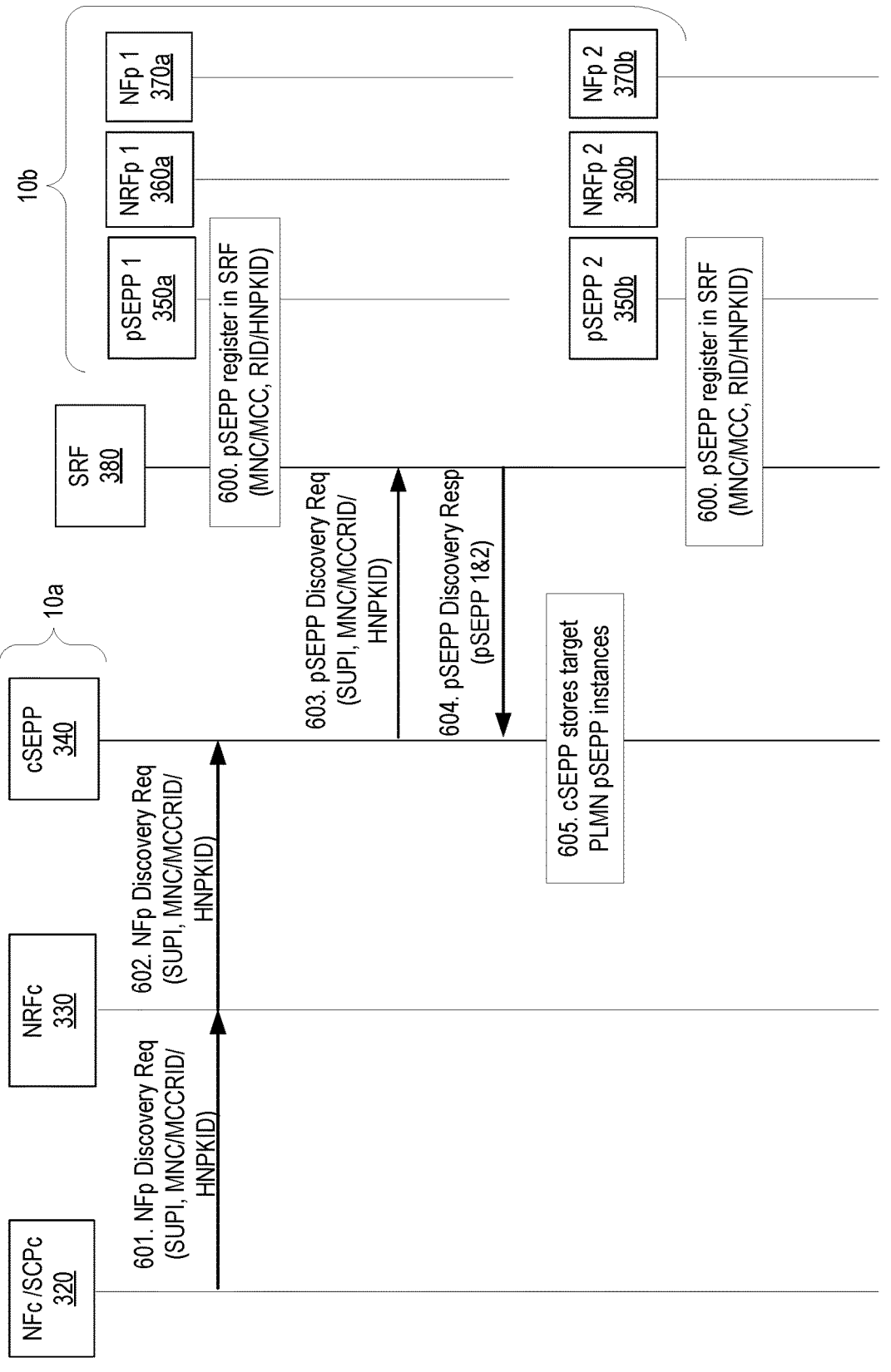
FIG. 6 is a call flow diagram illustrating a fourth example network function discovery procedure, according to particular embodiments of the present disclosure.

Yet another example embodiment of the present disclosure is illustrated in FIG. 6. The example of FIG. 6 includes a new network function called a SEPP Repository Function (SRF) 380. The SRF 380 may be located in either PLMN 10*a*, PLMN 10*b*, or elsewhere. In the example illustrated in FIG. 6, the SEPPs 350*a*, 350*b* of PLMN 10*b* can register themselves in the SRF 380 (step 600). This registration may, for example, include SEPP segmentation parameters (e.g., SUPI ranges, GIDs, RID/HNPKIDS, PLMN ID) if needed.

As in previous examples, the service consumer 320 may send a discovery request to an NRFc 330 (step 601). Thus, the NRFc 330 can receive the discovery request from the service consumer 320. The NRFc 330 may forward the discovery request to the cSEPP 340 (step 602). Thus, the cSEPP 340 can receive the discovery request from the NRFc 330. In the example illustrated in FIG. 6, the cSEPP 340 may send a discovery request for the SEPP instances 350*a*, 350*b* deployed at the target PLMN 10*b* to the SRF 380 (step 603). Thus, the SRF 380 can receive the discovery request from the cSEPP 340. The SRF 380 may send a discovery response to the cSEPP 340 (step 604). Thus, the cSEPP 340 can receive the discovery response from the SRF 380. The pSEPP discovery response can include the list of pSEPPs 350*a*, 350*b* in the PLMN 10*b*. This information may also include, e.g., the segmentation parameters discussed above. The cSEPP 340 may then store the pSEPP instances (and the segmentation parameters, if provided) for later use as described in previous examples (step 605). Thus, the cSEPP 340 may discover the pSEPP instances 350*a*, 350*b* in target PLMN 10*b* via the SRF 380 before establishing a corresponding N32 connection to a most appropriate pSEPP 350*b* for a given inbound roaming UE. Such an SRF 380 may, in some embodiments, be defined by the GSMA. Having established an N32 connection to an appropriate pSEPP 350*b*, the embodiments may proceed according to steps 407 through 416 as previously described above with respect to FIG. 4B.

Given all of the above, embodiments of the present disclosure include a method 700 implemented by a security relay node (e.g., a SEPP 95, vSEPP 185, cSEPP 340), as illustrated in FIG. 7. The security relay node may alternatively be referred to as a security network node. The method 700 comprises receiving a discovery request from a service consumer 320, the discovery request requesting discovery of a network function 370*a*, 370*b* to provide a service (block 710). The method 700 further comprises directing the discovery request to a selected one of a plurality of remote security relay nodes (e.g. pSEPPs 350*a*, 350*b*) of a target PLMN 10*b* (block 720). The method further comprises forwarding, to the service consumer 320, a discovery response identifying the network function 370*a*, 370*b* to provide the service (block 730).

Other embodiments of the present disclosure include the security relay node 900 implemented according to the hardware illustrated in FIG. 8. The example hardware of FIG. 8 comprises processing circuitry 910, memory circuitry 920, and interface circuitry 930. The processing circuitry 910 can be communicatively coupled to the memory circuitry 920 and the interface circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions stored, e.g., as a machine-readable computer program 960 in the memory circuitry 920. The memory circuitry 920 of the various embodiments may comprise any non-transitory machine-readable media known in the art or that may be developed, whether volatile or non-volatile, including but not limited to solid state media (e.g., static random-access memory (SRAM), dynamic random-access memory (DRAM), display data random-access memory (DDRAM), read-only memory (ROM), programmable ROM (PROM), erasable PROM (EPROM), flash memory, solid state drive, etc.), removable storage devices (e.g., Secure Digital (SD) card, miniSD card, microSD card, memory stick, thumb-drive, universal serial bus (USB)) flash drive, ROM cartridge, Universal Media Disc), fixed drive (e.g., magnetic hard disk drive), or the like, wholly or in any combination.

The interface circuitry 930 may be a controller hub configured to control the input and output (I/O) data paths of the security relay node 900. Such I/O data paths may include data paths for exchanging signals over a communications network (e.g., a PLMN 10). For example, the interface circuitry 930 may comprise a transceiver configured to send and receive communication signals over a cellular network, Ethernet network, and/or an optical network.

The interface circuitry 930 may be implemented as a unitary physical component, or as a plurality of physical components that are contiguously or separately arranged, any of which may be communicatively coupled to any other or may communicate with any other via the processing circuitry 910 of the security relay node 900. For example, the interface circuitry 930 may comprise output circuitry (e.g., transmitter circuitry configured to send communication signals over the communications network) and input circuitry (e.g., receiver circuitry configured to receive communication signals over the communications network).

An embodiment of the present disclosure includes a security relay node 900 comprising processing circuitry 910 and optionally also a memory (or memory circuitry) 920. The memory 920 can contain instructions executable by the processing circuitry 910. The security relay node 900 is configured to perform the method described herein. For example, the instructions contained in the memory 920 can, when executed by the processing circuitry 910, cause the security relay node 900 to perform the method described herein.

In particular, e.g. according to embodiments of the hardware illustrated in FIG. 8, the security relay node 900 (or, more specifically, the processing circuitry 910 of the security relay node 900) is configured to receive a discovery request from a service consumer 320. The discovery request requests discovery of a network function 370*a*, 370*b* to provide a service. The security relay node 900 (or, more specifically, the processing circuitry 910 of the security relay node 900) is further configured to direct the discovery request to a selected one of a plurality of remote security relay nodes 350*a*, 350*b* of a target network (e.g. PLMN 10*b*). The security relay node 900 (or, more specifically, the processing circuitry 910 of the security relay node 900) is further configured to forward, to the service consumer 320, a discovery response identifying the network function 370*a*, 370*b* to provide the service. The security relay node 900 can also be configured to perform any one or more other steps of the method described herein.

Other embodiments of the present disclosure include a computer program (e.g. the computer program 960 in the memory circuitry 920 illustrated in FIG. 8), comprising instructions which, when executed on processing circuitry 910 of the security relay node 900, cause the processing circuitry 910 to carry out the method described herein. Other embodiments of the present disclosure include a carrier containing this computer program. The carrier can, for example, be one of an electronic signal, optical signal, radio signal, or computer readable storage medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, implemented by a security relay node in a communication network, the method comprising:
   receiving a discovery request from a service consumer, the discovery request requesting discovery of a network function to provide a service;
   discovering a plurality of remote security relay nodes of a target network in response to receiving the discovery request requesting discovery of the network function, wherein discovering the plurality of remote security relay nodes comprises sending a further discovery request to a primary one of the remote security relay nodes, to a Network Repository Function (NRF), or to a repository function, the further discovery request requesting identification of the remote security relay nodes;
   selecting one of the remote security relay nodes from the plurality of remote security relay nodes;
   directing the discovery request to the selected remote security relay node; and
   forwarding, to the service consumer, a discovery response identifying the network function to provide the service.

2. The method of claim 1, further comprising passing signaling relating to the service between the service consumer and the network function providing the service through the selected remote security relay node.

3. The method of claim 1, wherein sending the further discovery request to the primary one of the remote security relay nodes comprises sending the further discovery request to the primary one of the remote security relay nodes during establishment of a first N32 connection with the primary one of the remote security relay nodes.

4. The method of claim 1, further comprising:
   establishing a first N32 connection with the primary one of the remote security relay nodes; and
   wherein sending the further discovery request comprises sending the further discovery request to the NRF via the primary remote security relay node over the first N32 connection.

5. The method of claim 1, wherein:
   sending the further discovery request comprises sending the further discovery request to the repository function.

6. The method of claim 5, wherein each of the plurality of remote security relay nodes is registered with the repository function in advance of the sending of the further discovery request.

7. The method of claim 5, wherein the repository function is preconfigured with addresses of the plurality of remote security relay nodes in advance of the sending of the further discovery request.

8. The method of claim 1, further comprising, responsive to selecting the one of a plurality of remote security relay nodes, establishing a second N32 connection with the selected one of the plurality of remote security relay nodes and directing the discovery request via the second N32 connection.

9. The method of claim 1, wherein each of the remote security relay nodes is associated with a respective segment of the target network, each segment corresponding to a respective set of one or more subscriber identifiers.

10. A security relay node comprising:
   processing circuitry and a memory, the memory containing instructions executable by the processing circuitry whereby the security relay node is configured to:
   receive a discovery request from a service consumer, the discovery request requesting discovery of a network function to provide a service;
   discover a plurality of remote security relay nodes of a target network in response to receiving the discovery request requesting discovery of the network function, wherein discovering the plurality of remote security relay nodes comprises sending a further discovery request to a primary one of the remote security relay nodes, to a Network Repository Function (NRF), or to a repository function, the further discovery request requesting identification of the remote security relay nodes;

select one of the remote security relay nodes from the plurality of remote security relay nodes;

direct the discovery request to the selected remote security relay node; and forward, to the service consumer, a discovery response identifying the network function to provide the service.

11. The security relay node of claim 10, further configured to pass signaling relating to the service between the service consumer and the network function providing the service through the selected remote security relay node.

12. The security relay node of claim 10, wherein to send the further discovery request to the primary one of the remote security relay nodes the security relay node is configured to send the further discovery request to the primary one of the remote security relay nodes during establishment of a first N32 connection with the primary one of the remote security relay nodes.

13. The security relay node of claim 10, further configured to:

establish a first N32 connection with the primary one of the remote security relay nodes; and wherein to send the further discovery request the security relay node is configured to send the further discovery request to the NRF via the primary remote security relay node over the first N32 connection.

14. The security relay node of claim 10, wherein:

to send the further discovery request the security relay node is configured to send the further discovery request to the repository function.

15. The security relay node of claim 14, wherein each of the plurality of remote security relay nodes is registered with the repository function in advance of the sending of the further discovery request.

16. The security relay node of claim 14, wherein the repository function is preconfigured with addresses of the plurality of remote security relay nodes in advance of the sending of the further discovery request.

17. The security relay node of claim 10, further configured to, responsive to selecting the one of a plurality of remote security relay nodes, establish a second N32 connection with the selected one of the plurality of remote security relay nodes and direct the discovery request via the second N32 connection.

18. The security relay node of claim 10, wherein each of the remote security relay nodes is associated with a respective segment of the target network, each segment corresponding to a respective set of one or more subscriber identifiers.

19. A non-transitory computer readable medium storing a computer program product for controlling a programmable security relay node, the computer program product comprising software instructions that, when run on the programmable security relay node, cause the programmable security relay node to:

receive a discovery request from a service consumer, the discovery request requesting discovery of a network function to provide a service;

discover a plurality of remote security relay nodes of a target network in response to receiving the discovery request requesting discovery of the network function, wherein discovering the plurality of remote security relay nodes comprises sending a further discovery request to a primary one of the remote security relay nodes, to a Network Repository Function (NRF), or to a repository function, the further discovery request requesting identification of the remote security relay nodes;

select one of the remote security relay nodes from the plurality of remote security relay nodes;

direct the discovery request to the selected remote security relay node; and forward, to the service consumer, a discovery response identifying the network function to provide the service.

* * * * *